United States Patent
Tanaka et al.

(10) Patent No.: US 7,396,900 B2
(45) Date of Patent: Jul. 8, 2008

(54) THIOURETHANE-BASED OPTICAL MATERIAL

(75) Inventors: Mamoru Tanaka, Omuta (JP);
Shigetoshi Kuma, Omuta (JP);
Munehito Funaya, Sodegaura (JP);
Seiichi Kobayashi, Omuta (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 11/707,919

(22) Filed: Feb. 20, 2007

(65) Prior Publication Data

US 2007/0149822 A1 Jun. 28, 2007

Related U.S. Application Data

(62) Division of application No. 10/509,765, filed as application No. PCT/JP03/04816 on Apr. 16, 2003, now Pat. No. 7,244,808.

(30) Foreign Application Priority Data

Apr. 19, 2002 (JP) .............................. 2002-117531

(51) Int. Cl.
*C08G 75/00* (2006.01)
*C08G 75/04* (2006.01)

(52) U.S. Cl. .................. 528/373; 528/374; 528/375; 525/330.9; 351/159

(58) Field of Classification Search ................ 528/373, 528/374, 375; 525/330.9; 351/159
See application file for complete search history.

(56) References Cited

U.S. PATENT DOCUMENTS

| | | | |
|---|---|---|---|
| 4,689,387 A | 8/1987 | Kajimoto et al. | |
| 4,775,733 A | 10/1988 | Kanemura et al. | |
| 5,087,758 A | 2/1992 | Kanemura et al. | |
| 5,608,115 A | 3/1997 | Okazaki et al. | |
| 6,596,841 B2 | 7/2003 | Tanaka et al. | |

FOREIGN PATENT DOCUMENTS

| | | |
|---|---|---|
| EP | 1 138 670 A1 | 4/2001 |
| EP | 1 134 242 A2 | 9/2001 |
| JP | 60-199016 | 10/1985 |
| JP | 62-267316 | 11/1987 |
| JP | 63-46213 | 2/1988 |
| JP | 2-270859 | 11/1990 |
| JP | 6-16657 A | 1/1994 |
| JP | 6-508099 A | 9/1994 |
| JP | 7-252207 | 10/1995 |
| JP | 08-157446 A | 6/1996 |
| JP | 09-012663 A | 1/1997 |
| JP | 2001-278881 A | 10/2001 |
| JP | 2001-288162 A | 10/2001 |
| JP | 2001-330701 A | 11/2001 |
| JP | 2001-342172 A | 12/2001 |
| JP | 2001-342252 A | 12/2001 |
| JP | 2002-14201 A | 1/2002 |
| JP | 2003-128668 A | 5/2003 |
| KR | 2001-0100851 A | 11/2001 |

*Primary Examiner*—Duc Truong
(74) *Attorney, Agent, or Firm*—Buchanan Ingersoll & Rooney PC

(57) ABSTRACT

A composition for making a high-refractive-index resin contains a polythiol compound and a compound containing at least two iso(thio)cyanato groups, the polythiol compound having a dithioacetal, dithioketal, orthotrithioformic ester, or orthotetrathiocarbonic ester skeleton. The molar ratio of the mercapto group to the iso(thio)cyanato group in the composition is greater than 1.0 but not more than 3.0. A method for making a resin by curing the composition, a resin prepared by curing the composition, an optical element made from the resin, and a lens made from the optical element are also provided.

2 Claims, No Drawings

THIOURETHANE-BASED OPTICAL MATERIAL

CROSS REFERENCE TO RELATED APPLICATIONS

This application is a division application of application Ser. No. 10/509,765 filed Sep. 30, 2004, now U.S. Pat. No. 7,244,808 which is a national stage application of PCT/JP2003/04816 filed Apr. 16, 2003.

TECHNICAL FIELD

The present invention relates to a resin for use in optical materials of plastic lenses, prisms, optical fibers, information recording boards, filters, light-emitting diodes, or the like, to a polymerizable composition, i.e., the ingredient, of the resin, and to a mercapto compound contained in the polymerizable composition. In particular, the present invention is suitable for application in spectacle lenses having a high refractive index.

BACKGROUND ART

Plastic lenses, which are lightweight and unbreakable compared to inorganic lenses and can be dyed, are increasingly used in optical elements such as spectacle lenses and camera lenses. Resins for making plastic lenses are required to exhibit high performance, such as high refractive index, high Abbe number, low specific gravity, high heat resistance, and the like. Various resin materials for making lenses have been developed and used to date. A representative example thereof is a plastic lens made from a polythiourethane resin (Japanese Unexamined Patent Application Publication Nos. 60-199016, 62-267316, and 63-46213). A polythiourethane resin that exhibits higher refractive index due to an increased sulfur content of thiol used in the polythiourethane has also been developed (Japanese Unexamined Patent Application Publication Nos. 2-270859 and 7-252207).

According to these methods, a high refractive index can be achieved while exhibiting a relatively high Abbe number; however, in order to obtain a polyurethane resin having a yet higher refractive index, a novel thiol having a high sulfur content or a novel polyisocyanate having a high sulfur content must be developed. Despite the need, the development of novel compounds is not easy. Moreover, in order for it to be used in optical elements such as resins for making plastic lenses, physical properties, such as transparency, hue, heat resistance, and shock resistance, other than the refractive index must also be high. Development of a high-refractive-index urethane resin that satisfies all of these requirements is highly difficult.

In a typical conventional process of making a thiourethane resin by polymerization of polythiol and polyiso(thio)cyanate, the polymerizable composition has been prepared such that the molar ratio of a mercapto group to an iso(thio)cyanato group is 1. No examples that investigated the molar ratio and the physical properties of the resin have existed. The reason for this is because when the molar ratio is made greater than 1 using a conventional polythiol compound, i.e., when the mercapto group is excessive relative to the iso(thio)cyanato group, the heat resistance of the resin prepared by polymerization becomes dramatically poor, and the resin may not be applied to optical elements such as plastic lenses. In general, however, high-sulfur-content compounds exhibit high refractive index; hence, the refractive index of polythiol compounds is in most cases higher than that of polyiso(thio)cyanate. Accordingly, if a thiourethane resin can be prepared by using an excessive amount of polythiol, which has a higher refractive index than polyiso(thio)cyanate, a resin with higher refractive index can be made.

Accordingly, an object of the present invention is to provide a method for easily obtaining a high-refractive-index resin.

DISCLOSURE OF INVENTION

The present inventors have conducted extensive investigations to overcome the above-described problems. As a result, the present inventors have found that these problems can be overcome by using a polythiol compound characterized in having a dithioacetal, a dithioketal, an orthotrithioformic ester, or an orthotetrathiocarbonic ester skeleton in a molecule. In particular, the inventors have found that, in a polymerizable composition containing polyiso(thio)cyanate and a polythiol compound having a dithioacetal, dithioketal, orthotrithioformic ester, or orthotetrathiocarbonic ester skeleton in a molecule, a decrease in heat resistance of the resin can be minimized and a resin with higher refractive index can be obtained by curing the polymerizable composition whose molar ratio of mercapto to iso(thio)cyanato is greater than 1.0, i.e., the polymerizable composition containing an excessive amount of the mercapto group relative to the iso(thio)cyanato group. Thus, the inventors have made the present invention based on these findings.

In particular, the features of the present invention are as follows.

[1] A polymerizable composition for making a high-refractive-index resin, the composition containing a polythiol compound having a dithioacetal, dithioketal, orthotrithioformic ester, or orthotetrathiocarbonic ester skeleton, and at least two mercapto groups; and a compound having at least two iso(thio)cyanato groups, wherein the molar ratio of the mercapto group to the iso(thio)cyanato group is greater than 1.0 but not more than 3.0.

[2] The polymerizable composition according to [1] wherein the polythiol compound has a mercaptomethylthio group.

[3] The polymerizable composition according to [1] or [2], wherein the polythiol compound having the dithioketal or dithioacetal skeleton is represented by General Formula (1)

(1)

(wherein $R^1$ is an aliphatic residue, a heterocyclic residue, or an aromatic residue with a valence of n; $R^2$ is a hydrogen atom, an aliphatic residue, a heterocyclic residue, or an aromatic residue with a valence of 1; and $R^3$ and $R^4$ are each independently an aliphatic residue, a heterocyclic residue, or an aromatic residue with a valence of 1, and $R^3$ and $R^4$ may bond to each other to form a ring or each may bond to $R^3$ or $R^4$ in another set of parentheses to form a ring when n is 2 or more; wherein at least one of $R^1$, $R^2$, $R^3$, and $R^4$ must have at least one mercapto group, and $m1+(m2+m3+m4) \times n \geq 2$, wherein m1, m2, m3, and m4 represent the numbers of mercapto group contained in $R^1$, $R^2$, $R^3$, and $R^4$, respectively; wherein n is an integer of 1 or more.)

[4] The polymerizable composition according to [3], wherein $R^2$ in General Formula (1) is a hydrogen atom.

[5] The polymerizable composition according to [4], wherein the polythiol compound having the dithioacetal skeleton is at least one selected from the group consisting of 1,1,3,3-tetrakis(mercaptomethylthio)propane, 1,1,2,2-tetrakis(mercaptomethylthio)ethane, 4,6-bis(mercaptomethylthio)-1,3-dithiane, and 2-(2,2-bis(mercaptomethylthio)ethyl)-1,3-dithietane.

[6] The polymerizable composition according to [1] or [2], wherein the polythiol compound having the orthotrithioformic ester skeleton is represented by General Formula (2)

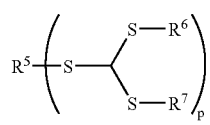

(wherein $R^5$ is an aliphatic residue, a heterocyclic residue, or an aromatic residue with a valence of p, and $R^6$ and $R^7$ are each independently an aliphatic residue, a heterocyclic residue, or an aromatic residue with a valence of 1 and may bond to each other to form a ring; wherein at least one of $R^5$, $R^6$ and $R^7$ must have at least one mercapto group, and $m5+(m6+m7)\times p \geq 2$, wherein m5, m6, and m7 represent the numbers of mercapto group contained in $R^5$, $R^6$, and $R^7$, respectively; and wherein p is an integer of 1 or more.)

[7] The polymerizable composition according to [6], wherein $R^6$ and $R^7$ are each a mercaptomethyl group.

[8] The polymerizable composition according to [7], wherein the polythiol compound represented by General Formula (2) is at least one selected from the group consisting of tris(mercaptomethylthio)methane, 1,1,5,5-tetrakis(mercaptomethylthio)-2,4-dithiapentane, and bis(4,4-bis(mercaptomethylthio)-1,3-dithiabutyl)(mercaptomethylthio)methane.

[9] The polymerizable composition according to [1] or [2], containing the polythiol compound having the orthotetrathiocarbonic ester skeleton represented by General Formula (3)

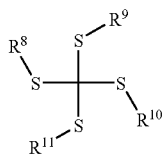

(wherein $R^8$, $R^9$, $R^{10}$, and $R^{11}$ are each independently an aliphatic residue, a heterocyclic residue, or an aromatic residue and may each bond with one of other residues to form a ring; wherein at least one of $R^8$, $R^9$, $R^{10}$, and $R^{11}$ must contain at least one mercapto group, and $m8+m9+m10+m11 \geq 2$, wherein m8, m9, m10, and m11 represent the numbers of mercapto group in $R^8$, $R^9$, $R^{10}$, and $R^{11}$, respectively.)

[10] A method for making a resin by curing the polymerizable composition according to any one of [1] to [9].

[11] A resin prepared by curing the polymerizable composition according to any one of [1] to [9].

[12] An optical element comprising the resin according to [11].

[13] A lens comprising the optical element according to [12].

[14] 4,6-bis(mercaptomethylthio)-1,3-dithiane.

[15] 2-(2,2-bis(mercaptomethylthio)ethyl)-1,3-dithietane.

BEST MODE FOR CARRYING OUT THE INVENTION

The present invention will now be described in detail.

In the invention, the excess rate of the polythiol compound is determined ad libitum. In preparing a polymerizable composition, polythiol and polyiso(thio)cyanato are prepared so that the molar ratio of the mercapto group to the iso(thio) cyanato group is greater than 1.0 but not more than 3.0.

The polymerizable composition of the invention is characterized in that the mercapto group is excessive relative to the iso(thio)cyanato group in the composition. In other words, the molar ratio (SH/NCO) of the mercapto group to the isocyanato group is adjusted to be greater than 1.0. In this manner, a resin exhibiting a higher refractive index compared to when the molar ratio is 1.0 can be obtained. On the other hand, the upper limit of the molar ratio depends on the heat resistance of the resin cured at a molar ratio of 1.0; however, the cured product exhibits satisfactory heat resistance when the molar ratio is not more than 3.0.

In the present invention, the molar ratio of the mercapto group to the isocyanato group is $1.0 < (SH/NCO) \leq 3.0$, preferably, $1.01 < (SH/NCO) \leq 3.0$, more preferably $1.01 < (SH/NCO) \leq 2.0$, and most preferably $1.05 < (SH/NCO) \leq 1.3$.

The polythiol compound of the present invention has a dithioacetal, dithioketal, orthotrithioformic ester, or orthotetrathiocarbonic ester polythiol skeleton. No particular limit is imposed as long as the polythiol has any of these skeletons. For example, the polythiol having the dithioacetal or dithioketal skeleton can be represented by General Formula (1):

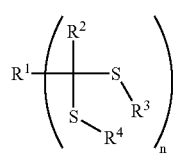

Here, $R^1$ is an aliphatic residue, a heterocyclic residue, or an aromatic residue with a valence of n; $R^2$ is a hydrogen atom, an aliphatic residue, a heterocyclic residue, or an aromatic residue with a valence of 1; and $R^3$ and $R^4$ are each independently an aliphatic residue, a heterocyclic residue, or an aromatic residue with a valence of 1, and $R^3$ and $R^4$ may bond to each other to form a ring or each may bond to $R^3$ or $R^4$ in another set of parentheses to form a ring when n is 2 or more. At least one of $R^1$, $R^2$, $R^3$, and $R^4$ must have at least one mercapto group, and $m1+(m2+m3+m4)\times n \geq 2$, wherein m1, m2, m3, and m4 represent the numbers of mercapto group contained in $R^1$, $R^2$, $R^3$, and $R^4$, respectively, and n is an integer of 1 or more.

$R^1$ may be any as long as $R^1$ is an organic residue having a valence of n derived from aliphatic, heterocyclic, or aromatic. Preferably, the number of carbon atoms is in the range of 1 to 15. Examples thereof include organic residues having a valence of n derived from straight-chain aliphatic groups such as methane, ethane, propane, butane, pentane, hexane, ethylene, propylene, 1-butene, 2-butene, butadiene, and the like; organic residues having a valence of n derived from cyclic fatty series such as cyclopentane, cyclopentene, cyclopentadiene, cyclohexane, 1,2-dimethylcyclohexane, 1,3-dimethylcyclohexane, 1,4-dimethylcyclohexane, cyclohexene, 1,3-cyclohexadiene, 1,4-cyclohexadiene, norbornane, 2,3-dimethylnorbornane, 2,5-dimethylnorbornane, 2,6-dimethylnorbornane, bis(4-methylcyclohexyl)methane, and the like;

organic residues having a valence of n derived from heterocycles such as thiolane, 2,5-dimethylthiolane, 3,4-dimethylthiolane, 2,3-dimethylthiolane, 2,4-dimethylthiolane, 2,5-diethylthiolane, 3,4-diethylthiolane, 2,3-diethylthiolane, 1,3-dithiolene, 2,4-dimethyl-1,3-dithiolene, 4,5-dimethyl-1,3-dithiolene, 2,4-diethyl-1,3-dithiolene, 4,5-diethyl-1,3-dithiolene, 1,3-dithiolane, 2,4-dimethyl-1,3-dithiolane, 4,5-dimethyl-1,3-dithiolane, 2,4-diethyl-1,3-dithiolane, 4,5-diethyl-1,3-dithiolane, thiophene, 2,5-dimethylthiophene, 1,4-dithiane, 2,5-dimethyl-1,4-dithiane, 2,6-dimethyl-1,4-dithiane, 2,3-dimethyl-1,4-dithiane, 2,5-diethyl-1,4-dithiane, 2,6-diethyl-1,4-dithiane, 2,3-diethyl-1,4-dithiane, 1,3,5-trithiane, 2,4-dimethyl-1,3,5-trithiane, 2,4-diethyl-1,3,5-trithiane, thiazole, 1,3,4-thiadiazole, 1,3-dithietane, 2,4-dimethyl-1,3-dithietane, 2,4-diethyl-1,3-dithietane, and the like;

organic residues having a valence of n derived from aromatic series such as benzene, o-xylene, m-xylene, p-xylene, naphthalene, biphenyl, anthracene, perylene, styrene, ethylbenzene, and the like; and organic groups having a valence of n formed by removing mercapto groups from conventional thiol compounds.

Examples of the conventional thiol compounds include monofunctional thiols such as methanethiol, ethanethiol, 2-mercaptoethyl-1,3-dithiane, thiophenol, and benzylthiol; aliphatic polythiol compounds such as methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, bis(2-mercaptoethyl) thiomalate, 2,3-dimercapto-1-propanol(2-mercaptoacetate), 2,3-dimercapto-1-propanol(3-mercaptopropionate), diethylene glycol bis(2-mercaptoacetate), diethylene glycol bis(3-mercaptopropionate), 1,2-dimercapto propyl methyl ether, 2,3-dimercapto propyl methyl ether, 2,2-bis(mercaptomethyl)-1,3-propanedithiol, bis(2-mercaptoethyl)ether, ethylene glycol bis(2-mercaptoacetate), ethylene glycol bis(3-mercaptopropionate), trimethylol propane bis(2-mercaptoacetate), trimethylol propane bis(3-mercaptopropionate), pentaerythritol tetrakis(2-mercaptoacetate), pentaerythritol tetrakis(3-mercaptopropionate), and tetrakis(mercaptomethyl) methane;

aromatic polythiols such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, and 2,4-di(p-mercaptophenyl)pentane;

aromatic polythiol compounds containing sulfur atoms other than in the mercapto groups such as 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio) benzene, and 1,3,5-tris(mercaptoethylthio)benzene, and ring-alkylated derivatives of these;

bis(mercaptomethyl)sulfide, bis(mercaptomethyl)disulfide, bis(mercaptoethyl)sulfide, bis(mercaptoethyl)disulfide, bis(mercaptopropyl) sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropyl) ethane, 1,3-bis(mercaptomethylthio)propane, 1,3-bis(2-mercaptoethylthio)propane, 1,3-bis(3-mercaptopropylthio) propane, 1,2,3-tris(mercaptomethylthio)propane, 1,2,3-tris(2-mercaptoethylthio)propane, 1,2,3-tris(3-mercaptopropylthio)propane, 1,2-bis[(2-mercaptoethyl) thio]-3-mercaptopropane, 4,8-dimercaptomethyl-1,11-mercapto-3,6,9-trithiaundecane, 4,7-dimercaptomethyl-1,11-mercapto-3,6,9-trithiaundecane, 5,7-dimercaptomethyl-1,11-mercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, bis(1,3-dimercaptopropyl)sulfide, 2,5-dimercapto-1,4-dithiane, 2,5-dimercaptomethyl-1,4-dithiane, 2,5-dimercaptomethyl-2,5-dimethyl-1,4-dithiane, bis(mercaptomethyl)disulfide, bis(mercaptoethyl)disulfide, and bis(mercaptopropyl)disulfide, and esters of thioglycolates and mercaptopropionates of these;

aliphatic polythiol compounds containing sulfur atoms other than in the mercapto groups, such as hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethylether bis(2-mercaptoacetate), 2-mercaptoethylether bis(3-mercaptopropionate), 1,4-dithiane-2,5-diol bis(2-mercaptoacetate), 1,4-dithiane-2,5-diol bis(3-mercaptopropionate), bis(2-mercaptoethyl) thiodiglycolate, bis(2-mercaptoethyl) thiodipropionate, bis(2-mercaptoethyl) 4,4-thiodibutylate, bis(2-mercaptoethyl)dithiodiglycolate, bis(2-mercaptoethyl) dithiodipropionate, bis(2-mercaptoethyl) 4,4-dithiodibutylate, bis(2,3-dimercaptopropyl) thiodiglycolate, bis(2,3-dimercaptopropyl) bis(2,3dimercaptopropyl) thiodipropionate, bis(2,3-dimercaptopropyl) dithioglycolate, and bis(2,3-dimercaptopropyl)dithiodipropionate;

heterocyclic compounds containing sulfur atoms other than in the mercapto groups, such as 3,4-thiophenedithiol and 2,5-dimercapto-1,3,4-thiadiazole; and compounds containing hydroxyl groups in addition to the mercapto groups, such as 2-mercaptoethanol, 3-mercapto-1,2-propanediol, glycerin di(mercaptoacetate), 1-hydroxy-4-mercaptocyclohexane, 2,4-dimercaptophenol, 2-mercaptohydroquinone, 4-mercaptophenol, 3,4-dimercapto-2-propanol, 1,3-dimercapto-2-propanol, 2,3-dimercapto-1-propanol, 1,2-dimercapto-1,3- butanediol, pentaerythritol tris(3-mercaptopropionate), pentaerythritol mono(3-mercaptopropionate), pentaerythritol bis(3-mercaptopropionate), pentaerythritol tris(thioglycolate), dipentaerythritol pentakis(3-mercaptopropionate), hydroxymethyl-tris(mercaptoethylthiomethyl)methane, and 1-hydroxyethylthio-3-mercaptoethylthiobenzene.

Examples of the monovalent aliphatic residue, heterocyclic residue, and aromatic residue in $R^2$, $R^3$, and $R^4$ include monovalent organic residues derived from examples of straight-chain aliphatic series, cyclic aliphatic series, heterocycles, and aromatic series described in $R^1$; and organic residues obtained by removing mercapto groups from the above-described thiol compounds. When $R^3$ and $R^4$ bond to each other to form a ring, examples of the ring that contains a dithioacetal structure include four- to eight-membered rings, such as 1,3-dithiacyclobutane, 1,3-dithiacyclopentane, 1,3-dithiacyclohexane, 1,3-dithiacycloheptane, and the like. Moreover, when n is 2 or more, $(R^3)$s in different sets of parentheses bond to form a ring. For example, 4,6-bis(mercaptomethylthio)-1,3-dithiacyclohexane is included in the example.

n may be any integer as long as n is not less than 1. Since purification, handling, or the like becomes difficult as n increases, n is preferably an integer between 1 and 4.

Specific examples of the compound represented by Formula (1) include 1,1,3,3-tetrakis(mercaptomethylthio)propane, 1,1,2,2-tetrakis(mercaptomethylthio)ethane, 4,6-bis(mercaptomethylthio)-1,3-dithiacyclohexane, 1,1,5,5-tetrakis(mercaptomethylthio)-3-thiapentane, 1,1,6,6-tetrakis(mercaptomethylthio)-3,4-dithiahexane, 2,2-bis(mercaptomethylthio)ethanethiol, 2-(4,5-dimercapto-2-thiapentyl)-1,3-dithiacyclopentane, 2,2-bis(mercaptomethyl)-1,3-dithiacyclopentane, 2,5-bis(4,4-bis(mercaptomethylthio)-2-thiabutyl)-1,4-dithiane, 2,2-bis(mercaptomethylthio)-1,3-propanedithiol, 3-mercaptomethylthio-1,7-dimercapto-2,6-dithiaheptane, 3,6-bis(mercaptomethylthio)-1,9-dimercapto-2,5,8-trithianonane, 4,6-bis(mercaptomethylthio)-1,9-dimercapto-2,5,8-trithianonane, 3-mercaptomethylthio-1,6-dimercapto-2,5-dithiahexane, 2-(2,2-bis(mercaptomethylthio)ethyl)-1,3-dithietane, 1,1,9,9-tetrakis(mercaptomethylthio)-5-(3,3-bis(mercaptomethylthio)-1-thiapropyl)3,7-dithianonane, tris(2,2-bis(mercaptomethylthio)ethyl)methane, tris(4,4-bis(mercaptomethylthio)-2-thiabutyl)methane, tetrakis(2,2-bis(mercaptomethylthio)ethyl)methane, tetrakis(4,4-bis(mercaptomethylthio)-2-thiabutyl)methane, 3,5,9,11-tetrakis(mercaptomethylthio)-1,13-dimercapto-2,6,8,12-tetrathiatridecane, 3,5,9,11,15,17-hexakis(mercaptomethylthio)-1,19-dimercapto-2,6,8,12,14,18-hexathianonadecane, 9-(2,2-bis(mercaptomethylthio)ethyl)-3,5,13,15-tetrakis(mercaptomethylthio)-1,17-dimercapto-2,6,8,10,12,16-hexathiaheptadecane, 3,4,8,9-tetrakis(mercaptomethylthio)-1,11-dimercapto-2,5,7,10-tetrathiaundecane, 3,4,8,9,13,14-hexakis(mercaptomethylthio)-1,16-dimercapto-2,5,7,10,12,15-hexathiahexadecane, 8-{bis(mercaptomethylthio)methyl}-3,4,12,13-tetrakis(mercaptomethylthio)-1,15-dimercapto-2,5,7,9,11,14-hexathiapentadecane, 4,6-bis{3,5-bis(mercaptomethylthio)-7-mercapto-2,6-dithiaheptylthio}-1,3-dithiane, 4-{3,5-bis(mercaptomethylthio)-7-mercapto-2,6-dithiaheptylthio}-6-mercaptomethylthio-1,3-dithiane, 1,1-bis{4-(6-mercaptomethylthio)-1,3-dithianylthio}-3,3-bis(mercaptomethylthio)propane, 1,3-bis{4-(6-mercaptomethylthio)-1,3-dithianylthio}-1,3-bis(mercaptomethylthio)propane, 1-{4-(6-mercaptomethylthio)-1,3-dithianylthio}-3-{2,2-bis(mercaptomethylthio)ethyl}-7,9-bis(mercaptomethylthio)-2,4,6,10-tetrathiaundecane, 1-{4-(6-mercaptomethylthio)-1,3-dithianylthio}-3-{2-(1,3-dithietanyl)}methyl-7,9-bis(mercaptomethylthio)-2,4,6,10-tetrathiaundecane, 1,5-bis{4-(6-mercaptomethylthio)-1,3-dithianylthio}-3-{2-(1,3-dithietanyl)}methyl-2,4-dithiapentane, 4,6-bis[3-{2-(1,3-dithietanyl)}methyl-5-mercapto-2,4-dithiapentylthio]-1,3-dithiane, 4,6-bis{4-(6-mercaptomethylthio)-1,3-dithianylthio}-1,3-dithiane, 4-{4-(6-mercaptomethylthio)-1,3-dithianylthio}-6-{4-(6-mercaptomethylthio)-1,3-dithianylthio}-1,3-dithiane, 3-{2-(1,3-dithietanyl)}methyl-7,9-bis(mercaptomethylthio)-1,11-dimercapto-2,4,6,10-tetrathiaundecane, 9-{2-(1,3-dithietanyl)}methyl-3,5,13,15-tetrakis(mercaptomethylthio)-1,17-dimercapto-2,6,8,10,12,16-hexathiaheptadecane, 3-{2-(1,3-dithietanyl)}methyl-7,9,13,15-tetrakis(mercaptomethylthio)-1,17-dimercapto-2,4,6,10,12,16-hexathiaheptadecane, 3,7-bis{2-(1,3-dithietanyl)}methyl-1,9-dimercapto-2,4,6,8-tetrathianonane, 4-{3,4,8,9-tetrakis(mercaptomethylthio)-11-mercapto-2,5,7,10-tetrathiaundecyl}-5-mercaptomethylthio-1,3-dithiolane, 4,5-bis{3,4-bis(mercaptomethylthio)-6-mercapto-2,5-dithiahexylthio}-1,3-dithiolane, 4-{3,4-bis(mercaptomethylthio)-6-mercapto-2,5-dithiahexylthio}-5-mercaptomethylthio-1,3-dithiolane, 4-{3-bis(mercaptomethylthio)methyl-5,6-bis(mercaptomethylthio)-8-mercapto-2,4,7-trithiaoctyl}-5-mercaptomethylthio-1,3-dithiolane, 2-[bis{3,4-bis(mercaptomethylthio)-6-mercapto-2,5-dithiahexylthio}methyl]-1,3-dithietane, 2-{3,4-bis(mercaptomethylthio)-6-mercapto-2,5-dithiahexylthio}mercaptomethylthiomethyl-1,3-dithietane, 2-{3,4,8,9-tetrakis(mercaptomethylthio)-11-mercapto-2,5,7,10-tetrathiaundecylthio}mercaptomethylthiomethyl-1,3-dithietane, 2-{3-bis(mercaptomethylthio)methyl-5,6-bis(mercaptomethylthio)-8-mercapto-2,4,7-trithiaoctyl}mercaptomethylthiomethyl-1,3-dithietane, 4,5-bis[1-{2-(1,3-dithietanyl)}-3-mercapto-2-thiapropylthio]-1,3-dithiolane, 4-[1-{2-(1,3-dithietanyl)}-3-mercapto-2-thiapropylthio]-5-{1,2-bis(mercaptomethylthio)-4-mercapto-3-thiabutylthio}-1,3-dithiolane, 2-[bis{4-(5-mercaptomethylthio-1,3-dithiolanyl)thio}]methyl-1,3-dithietane, 4-{4-(5-mercaptomethylthio-1,3-dithiolanyl)thio}-5-[1-{2-(1,3-dithietanyl)}-3-mercapto-2-thiapropylthio]-1,3-dithiolane, and the like. These examples are no limiting. Polymer compounds that have no particular repeated structure but have the dithioacetal or dithioketal skeleton and at least two mercapto groups may also be used.

The polythiol compound having the orthotrithioformic ester skeleton is not particularly limited. An example is a compound represented by General Formula (2)

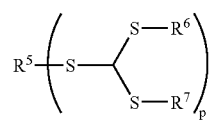

(2)

Here, $R^5$ is an aliphatic residue, a heterocyclic residue, or an aromatic residue with a valence of p; $R^6$ and $R^7$ are each independently an aliphatic residue, a heterocyclic residue, or an aromatic residue with a valence of 1, and $R^6$ and $R^7$ may bond to each other to form a ring. At least one of $R^5$, $R^6$ and $R^7$ must have at least one mercapto group, and m5+(m6+m7)×p≧2, wherein m5, m6, and m7 represent the numbers of mercapto group contained in $R^5$, $R^6$, and $R^7$, respectively, and p is an integer of 1 or more.

$R^5$ is not particularly limited as long as $R^5$ is any organic residue having a valence of p derived from aliphatic series, heterocycles, or aromatic series. Preferably, $R^5$ is an organic residue having a valence of p derived from any of examples of straight-chain aliphatic series, cyclic aliphatic series, heterocycles, and aromatic series described in $R^1$ of Formula (1) or an organic residue having a valence of p obtained by removing the mercapto group from the above-described conventional thiol compound. $R^6$ and $R^7$ are not particularly limited as long as they are each a monovalent organic residue derived from any of the above-described examples of aliphatic series, heterocycles, and aromatic series. Preferably, as with $R^3$ and $R^4$ in Formula (1), $R^6$ and $R^7$ are each an organic residue obtained by removing the mercapto group from the known thiol compound and may form a ring. p may be any integer not less than 1. As with n, p is preferably an integer in the range of 1 to 4.

Specific examples of the polythiol compound having the orthotrithioformic ester skeleton represented by Formula (2) include tris(mercaptomethylthio)methane, tris(mercaptoethylthio)methane, 1,1,5,5-tetrakis(mercaptomethylthio)-2,4-dithiapentane, bis(4,4-bis(mercaptomethylthio)-1,3-dithiabutyl)(mercaptomethylthio)methane, tris(4,4-bis(mercaptomethylthio)-1,3-dithiabutyl)methane, 2,4,6-tris(mercaptomethylthio)-1,3,5-trithiacyclohexane, 2,4-bis(mercaptomethylthio)-1,3,5-trithiacyclohexane, 1,1,3,3-tetrakis(mercaptomethylthio)-2-thiapropane, bis(mercaptomethyl)methylthio-1,3,5-trithiacyclohexane, tris((4-mercaptomethyl-2,5-dithiacyclohexyl-1-yl)methylthio)methane, 2,4-bis(mercaptomethylthio)-1,3-dithiacyclopentane, 2-mercaptoethylthio-4-mercaptomethyl-1,3-dithiacyclopentane, 2-(2,3-dimercaptopropylthio)-1,3-dithiacyclopentane, 4-mercaptomethyl-2-(2,3-dimercaptopropylthio)-1,3-dithiacyclopentane, 4-mercaptomethyl-2-(1,3-dimercapto-2-propylthio)-1,3-dithiacyclopentane, tris(2,2-bis(mercaptomethylthio)-1-thiaethyl)methane, tris(3,3-bis(mercaptomethylthio)-2-thiapropyl)methane, tris(4,4-bis(mercaptomethylthio)-3-thiabutyl)methane, 2,4,6-tris(3,3-bis(mercaptomethylthio)-2-thiapropyl)-1,3,5-trithiacyclohexane, tetrakis(3,3-bis(mercaptomethylthio)-2-thiapropyl)methane, and oligomers of these. These examples are no limiting. Moreover, polymers that do not have a particular repeated structure can be used as long as these polymers have the trithioorthoformic ester skeleton and at least two mercapto groups.

The polythiol compound having the tetrathioorthocarbonic ester skeleton is not particularly limited. An example is a compound represented by General Formula (3)

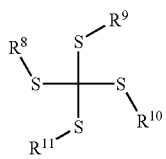

(3)

Here, $R^8$, $R^9$, $R^{10}$, and $R^{11}$ are each independently an aliphatic residue, a heterocyclic residue, or an aromatic residue and may each bond with one of other residues to form a ring. At least one of $R^8$, $R^9$, $R^{10}$, and $R^{11}$ must contain at least one mercapto group, and m8+m9+m10+m10≧2, wherein m8, m9, m10, and m11 represent the numbers of mercapto group in $R^8$, $R^9$, $R^{10}$, and $R^{11}$, respectively.

$R^8$, $R^9$, $R^{10}$, and $R^{11}$ are not particularly limited as long as they are aliphatic residues, heterocyclic residues, or aromatic residues. As with $R^3$ and $R^4$ in Formula (1), each of $R^8$, $R^9$, $R^{10}$, and $R^{11}$ is preferably an organic residue obtained by removing a mercapto group from a known thiol compound and may form a ring as with $R^3$ and $R^4$.

Specific examples of the polythiol compound having the tetrathioorthocarbonic ester skeleton represented by Formula (3) include 3,3'-di(mercaptomethylthio)-1,5-dimercapto-2,4-dithiapentane, 2,2'-di(mercaptomethylthio)-1,3-dithiacyclopentane, 2,7-di(mercaptomethyl)-1,4,5,9-tetrathiaspiro[4,4]nonane, and 3,9-dimercapto-1,5,7,11-tetrathiaspiro[5,5]undecane. These examples are no limiting. The polythiol compound may be a polymer having no particular repeated structure as long as the polymer has the tetrathiocarbonic ester skeleton and at least two mercapto groups.

The polythiol compound of the present invention is characterized by having a dithioacetal, dithioketal, orthotrithioformic ester, or orthotetrathiocarbonic ester skeleton in the molecule. Preferably, the polythiol compound additionally contains a mercaptomethylthio group to achieve yet higher refractive index and maintain heat resistance.

The polymerizable composition of the present invention is characterized by containing the above-described polythiol compound. The polythiol compounds described above may be used alone or in combination.

Moreover, other thiol compounds may be used in addition, if necessary.

Examples of other thiol compounds include aliphatic polythiol compounds such as methanedithiol, ethanedithiol, 1,1-propanedithiol, 1,2-propanedithiol, 1,3-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, bis(2-mercaptoethyl)thiomalate, 2,3-dimercapto-1-propanol(2-mercaptoacetate), 2,3-dimercapto-1-propanol(3-mercaptopropionate), diethylene glycol bis(2-mercaptoacetate), diethylene glycol bis(3mercaptopropionate), 1,2-dimercapto propyl methyl ether, 3-dimercapto propyl methyl ether, 2,2-bis(mercaptomethyl)-1,3-propanedithiol, bis(2-mercaptoethyl)ether, ethylene glycol bis(2-mercaptoacetate), ethylene glycol bis(3-mercaptopropionate), trimethylol propane bis(2-mercaptoacetate), trimethylol propane bis(3-mercaptopropionate), pentaerythritol tetrakis(2-mercaptoacetate), pentaerythritol tetrakis(3-mercaptopropionate), and tetrakis(mercaptomethyl)methane;

aromatic polythiols such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, and 2,4-di(p-mercaptophenyl)pentane;

aromatic polythiol compounds containing a sulfur atom other than in the mercapto group, such as 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, and 1,3,5-tris(mercaptoethylthio)benzene, and ring-alkylated derivatives of these;

aliphatic polythiol compounds containing a sulfur atom other than in the mercapto group such as bis(mercaptomethyl)sulfide, bis(mercaptoethyl)sulfide, bis(mercaptopropyl) sulfide, bis(2-mercaptoethylthio)methane, bis(3-mercaptopropylthio)methane, 1,2-bis(2-mercaptoethylthio)ethane, 1,2-bis(3-mercaptopropyl)ethane, 1,3-bis(2-mercaptoethylthio)propane, 1,3-bis(3-mercaptopropylthio)propane, 1,2,3-tris(2-mercaptoethylthio)propane, 1,2,3-tris(3-mercaptopropylthio)propane, 1,2-bis[(2-mercaptoethyl)thio]-3-mercaptopropane, 4,8-dimercaptomethyl-1,11-mercapto-3,6,9-trithiaundecane, 4,7-dimercaptomethyl-1,11-mercapto-3,6,9-trithiaundecane, 5,7-dimercaptomethyl-1,11-mercapto-3,6,9-trithiaundecane, tetrakis(2-mercaptoethylthiomethyl)methane, tetrakis(3-mercaptopropylthiomethyl)methane, bis(2,3-dimercaptopropyl)sulfide, bis(1,3-dimercaptopropyl)sulfide, 2,5-dimercapto-1,4-dithiane, 2,5-dimercaptomethyl-1,4-dithiane, 2,5-dimercaptomethyl-2,5-dimethyl-1,4-dithiane, bis(mercaptoethyl)disulfide, bis(mercaptopropyl)disulfide, and esters of thioglycolates and mercaptopropionates of these;

hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethylether bis(2-mercaptoacetate), 2-mercaptoethylether bis(3-mercaptopropionate), 1,4-dithiane-2,5-diol bis(2-mercaptoacetate), 1,4-dithiane-2,5-diol bis(3-mercaptopropionate), bis(2-mercaptoethyl)thiodiglycolate, bis(2-mercaptoethyl)thiodipropionate, bis(2-mercaptoethyl) 4,4-thiodibutylate, bis(2-mercaptoethyl)dithiodiglycolate, bis(2-mercaptoethyl)dithiodipropionate, bis(2-mercaptoethyl)4,4-dithiodibutylate, bis(2,3-dimercaptopropyl)thiodiglycolate, bis(2,3-dimercaptopropyl)thiodipropionate, bis(2,3-dimercaptopropyl)dithioglycolate, and bis(2,3-dimercaptopropyl)dithiodipropionate;

heterocyclic compounds containing sulfur atoms other than in the mercapto groups such as 3,4-thiophenedithiol, and 2,5-dimercapto-1,3,4-thiadiazole; and compounds containing hydroxyl groups and mercapto groups, such as 2-mercaptoethanol, 3-mercapto-1,2-propanediol, glycerin di(mercaptoacetate), 1-hydroxy-4-mercaptocyclohexane, 2,4-dimercaptophenol, 2-mercaptohydroquinone, 4-mercaptophenol, 3,4-dimercapto-2-propanol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), dipentaerythritol pentakis(3-mercaptopropionate), hydroxymethyl-tris(mercaptoethylthiomethyl) methane, and 1-hydroxyethylthio-3-mercaptoethylthiobenzene. These thiol compounds may be substituted with halogen such as chlorine or bromine.

Compounds having at least two iso(thio)cyanato groups used in the present invention are not particularly limited. Specific examples thereof include aliphatic polyisocyanate compounds such as hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanatomethyloctane, bis(isocyanatoethyl) carbonate, bis(isocyanatoethyl)ether, lysine diisocyanate methyl ester, lysine triisocyanate, xylylene diisocyanate, bis (isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethylphenyl)ether, bis(isocyanatoethyl)phthalate, and 2,6-di(isocyanatomethyl)furan;

alicyclic polyisocyanate compounds such as isophorone diisocyanate, bis(isocyanatomethyl)cyclohexane, cyclohexane diisocyanate, methylcyclohexane diisocyanate, 4,4'-methylene bis(cyclohexylisocyanate), 4,4'-methylene bis(2-methylcyclohexylisocyanate), 2,5-bis(isocyanatomethyl) bicyclo-[2,2,1]-heptane, 2,6-bis(isocyanatomethyl)bicyclo-[2,2,1]-heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl) tricyclodecane;

aromatic polyisocyanate compounds such as 1,2-diisocyanatobenzene, 1,3-diisocyanatobenzene, 1,4-diisocyanatobenzene, 2,4-diisocyanatotoluene, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4'-methylene bis(phenylisocyanate), 4,4'-methylene bis(2-methylphenyl isocyanate), bibenzyl-4,4'-diisocyanate, and bis(isocyanatophenyl)ethylene;

sulfur-containing aliphatic isocyanate compounds such as bis(isocyanatomethyl)sulfide, bis(isocyanatoethyl)sulfide, bis(isocyanatopropyl)sulfide, bis(isocyanatohexyl)sulfide, bis(isocyanatomethyl)sulfone, bis(isocyanatomethyl)disulfide, bis(isocyanatoethyl)disulfide, bis(isocyanatopropyl) disulfide, bis(isocyanatomethylthio)methane, bis(isocyanatoethylthio)methane, bis(isocyanatoethylthio)ethane, bis (isocyanatomethylthio)ethane, 1,5-diisocyanato-2-isocyanatomethyl-3-thiapentane, 1,2,3-tris (isocyanatomethylthio)propane, 1,2,3-tris (isocyanatoethylthio)propane, 3,5-dithia-1,2,6,7-heptane tetraisocyanate, 2,6-diisocyanatomethyl-3,5-dithia-1,7-heptane diisocyanate, 2,5-diisocyanate methyl thiophene, and 4-isocyanatoethylthio-2,6-dithia-1,8-octane diisocyanate;

aromatic sulfide-series isocyanate compounds such as 2-isocyanatophenyl-4-isocyanatophenyl sulfide, bis(4-isocyanatophenyl)sulfide, and bis(4-isocyanatomethylphenyl)sulfide;

aromatic disulfide-series isocyanate compounds such as bis(4-isocyanatophenyl)disulfide, bis(2-methyl-5-isocyanatophenyl)disulfide, bis(3-methyl-5-isocyanatophenyl) disulfide, bis(3-methyl-6-isocyanatophenyl)disulfide, bis(4-methyl-5-isocyanatophenyl)disulfide, bis(3-methoxy-4-isocyanatophenyl)disulfide, and bis(4-methoxy-3-isocyanatophenyl)disulfide;

sulfur-containing alicyclic compounds such as 2,5-diisocyanato tetrahydrothiophene, 2,5-diisocyanato methyl tetrahydrothiophene, 3,4-diisocyanatomethyl tetrahydrothiophene, 2,5-diisocyanato-1,4-dithiane, 2,5-diisocyanato methyl-1,4-dithiane, 4,5-diisocyanato-1,3-dithiolane, 4,5-bis(isocyanatomethyl)-1,3-dithiolane, and 4,5-diisocyanatomethyl-2-methyl-1,3-dithiolane;

aliphatic isothiocyanate compounds such as 1,2-diisothiocyanatoethane and 1,6-diisothiocyanatohexane; alicyclic isothiocyanate compounds such as cyclohexane diisocyanate; aromatic isotyiocyanate compounds such as 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-diisothiocyanatobiphenyl, 4,4'-methylene bis(phenylisothiocyanate), 4,4'-methylene bis(2-methylphenyl isothiocyanate), 4,4'-methylene bis(3-methylphenyl isothiocyanate), 4,4'-isopropylidenebis(phenylisothiocyanate), 4,4'-diisothiocyanatobenzophenone, 4,4'-diisothiocyanato-3,3'-dimethylbenzophenone, and bis(4-isothiocyanatophenyl)ether;

carbonyl isothiocyanate compounds such as 1,3-benzenedicarbonyldiisothiocyanate, 1,4-benzenedicarbonyldiisothiocyanate, and (2,2-pyridine)-4,4-dicarbonyl diisothiocyanate; sulfur-containing aliphatic isothiocyanate compounds such as thiobis(3-isothiocyanatopropane), thiobis(2-isothiocyanatoethane), and dithiobis(2-isothiocyanatoethane);

sulfur-containing aromatic isothiocyanate compounds such as 1-isothiocyanato-4-[(2-isothiocyanato)sulfonyl]benzene, thiobis(4-isothiocyanatobenzene), sulfonylbis(4-isothiocyanatobenzene), and dithiobis(4-isothiocyanatobenzene); sulfur-containing alicyclic compounds such as 2,5-diisothiocyanatothiophene and 2,5-diisothiocyanato-1,4-dithiane; and compounds containing isocyanato groups and isothiocyanato groups, such as 1-isocyanato-6-isothiocyanatohexane, 1-isocyanato-4-isothiocyanatocyclohexane, 1-isocyanato-4-isothiocyanatobenzene, 4-methyl-3-isocyanato-1-isocyanatobenzene, 2-isocyanato-4,6-diisothiocyanato-1,3,5-triazine, 4-isocyanatophenyl-4-isothiocyanatophenyl sulfide, and 2-isocyanatoethyl-2-isothiocyanatoethyl disulfide.

These compounds may be substituted with halogen, e.g., chlorine or bromine, alkyl, alkoxy, or nitro. Moreover, these compounds may be modified with polyalcohol (polymer type), carbodiimide, urea, or biuret. Dimer or trimer reaction products of these compounds may also be used.

These compounds may be used alone or in combination.

The polymerizable composition of the present invention may contain a resin modifier to modify the monomer system or the resin, i.e., to adjust the optical properties, such as refractive index of the resin, various physical properties, such as impact resistance and specific gravity, the viscosity of the polymerizable composition, handling ease, and the like.

Moreover, as in any conventional forming process, in order to cure the polymerizable composition of the present invention, various substances such as a chain extender, a crosslinker, a photostabilizer, a UV absorber, an antioxidant, an antiyellowing agent, a bluing agent, an oil-soluble dye, and a filler, may be added as required.

In order to achieve a target reaction rate, an adequate conventional reaction catalyst may be added. Preferable examples of the catalyst include urethane reaction catalysts such as tin compounds, e.g., dibutyltin dilaurate, dibutyltin dichloride, dimethyltin dichloride, and the like, and amine compounds such as tertiary amine. These catalysts may be used alone or in combination.

In general, the resin of the present invention is produced by mold injection polymerization. In particular, additives such as a catalyst, a UV absorber, and an internal mold release agent are blended into a target monomer in advance to prepare a mixture. The mixture may be prepared by any of the following methods: (1) adding the thiol component to a premix solution of additives in the isocyanate component; (2) adding the isocyanate component to a premix solution of additives in the thiol component; (3) dissolving the additives in a mixture of the isocyanate component and the thiol component; and (4) adding a mixture of the isocyanate component and the thiol component to a high-concentration master solution of the additives in the isocyanate component or the thiol component.

The resulting mixture was degassed by an adequate method, if necessary. Subsequently, the mixture is injected into a mold constituted from two glass plates and tapes or gaskets to carry out polymerization. The injection method is not particularly limited. Preferably, the viscosity of the monomer mixture is 20 to 1,000 mPa·s.

The polymerization conditions significantly vary according to the type and/or amount of the monomer and/or catalyst employed, the shape of the mold, and the like; hence, the polymerization conditions are not particularly limited. Thermal polymerization is performed at a temperature of −20 to 200° C. for 1 to 100 hours.

The resin of the invention produced as above is colorless and transparent, exhibits superior mechanical properties, and is suitable for use in optical elements, such as plastic lenses, prisms, optical fibers, information recording boards, filters, light-emitting diodes, and the like.

In order to improve lenses made from the optical resin of the present invention, i.e., to provide antireflection properties, high hardness, high wear resistance, high chemical resistance, high defogging properties, fashionable tastes, and the like to the lenses, the lenses may be subjected to physical and/or chemical treatment, if necessary. Examples of such treatment include surface polishing, antistatic treatment, hard coat treatment, non-reflecting coating treatment, and dyeing treatment. In dyeing treatment, a hot water bath containing dispersed dye is normally used; alternatively, a dyebath containing carrier, such as benzyl alcohol, that improves dyeing rate and dyeing density may be used.

EXAMPLES

The present invention will now be specifically described by way of examples.

The physical properties of the resin prepared by the polymerization were evaluated by the following methods.

Refractive Index (ne) and Abbe Number (ve): measured with a Pulfrich's refractometer at 20° C.

Heat resistance: Tg was measured by TMA penetration method (load: 50 g, probe diameter: 0.5 mm; temperature elevation rate 10° C./min). Impact resistance: Falling weight test was performed according to United States FDA standards. In this test, a 16-g steel ball was dropped from a height of 127 cm onto a lens having a thickness of 1.0 mm at the center. Lenses that remained unaffected were rated "A", those that allowed the steel ball to penetrate were rated "C", and those suffered star-shaped cracks were rated Synthetic Example 1

Into a 3-L round-bottomed flask equipped with a stirrer, a thermometer, and a Dimroth condenser was charged 117.7 g (1.11 mol) of trimethyl orthoformate, 200.0 g (2.49 mol) of methanedithiol, 2 L of toluene, and 23.6 g (0.124 mol) of p-toluenesulfonic acid. The resulting mixture was stirred at 20° C. for 43 hours. The resulting reaction solution was washed several times with water. After performing solvent extraction of the organic layer to remove toluene and low-boiling-point components, the resulting mixture was filtered with a 3-μm Teflon filter to obtain 122.5 g of a polythiol compound mixture (hereinafter, simply "polythiol compound A").

Three peaks were observed by gel permeation chromatography (GPC) (columns: 7.8 mm×300 mm, G1000HXL manufactured by Tosoh Corporation; eluent: THF) of the polythiol compound A, and the peak area ratio was 18:29:53. Among these three components, two components with lower molecular weight were batched off by means of liquid chromatography and were identified as tris(mercaptomethylthio)methane (hereinafter TMMTM) and 1,1,5,5-tetrakis(mercaptomethylthio)-2,4-dithiapentane (hereinafter TMMTDTP). Analysis results of these two compounds are shown below. Moreover, the molecular weight of the remaining one component was calculated from the GPC analysis results based on these two components. The number-average molecular weight of the remaining one component was 585, and the weight-average molecular weight was 589. These results revealed that this component was bis(4,4-bis(mercaptomethylthio)-1,3-dithiabutyl)(mercaptomethylthio)methane (molecular weight: 591).

The mercapto equivalent of the polythiol compound A per unit mass (hereinafter "SHV") was calculated from the peak area ratio of GPC. The SHV was 10.6 meq/g.

i) TMMTM
1H-NMR δ(CDCl3): 2.23 (t, 3H), 3.85 (d, 6H), 5.57 (s, 1H)
13C-NMR δ(CDCl3): 28.1, 52.7
FT-IR: 2540 cm$^{-1}$ ii) TMMTDTP
1H-NMR δ(CDCl3): 2.22 (t, 4H), 3.86 (d, 8H), 4.08 (s, 2H), 5.57 (s, 2H)
13C-NMR δ(CDCl3): 28.1, 35.65, 52.7
FT-IR: 2540 cm$^{-1}$

Example 1

In 47.2 g of xylylene diisocyanate were dissolved 10 mg of dibutyltin dichloride, i.e., the catalyst, 100 mg of Zelec UN (trade name, acidic alkyl phosphoric ester manufactured by Stepan Company), i.e., the internal mold release agent, and 50 mg of Viosorb 583 (trade name, manufactured by Kyodo Chemical Co., Ltd.), i.e., the UV absorber, to prepare a solution. Into the solution was added 52.8 g of the polythiol compound A produced in SYNTHETIC EXAMPLE 1, and the resulting mixture was thoroughly stirred to prepare a monomer mixture. The molar ratio of the mercapto group to the isocyanato group in the monomer mixture was SH/NCO=1.12 at this stage. The monomer mixture was degassed for one hour at 0.6 kPa. A moiety of the mixture was then injected into a lens mold, gradually heated from 40° C. to 120° C., and cured over 21 hours. After cooling, the produced lens was released from the glass mold. The lens was colorless and transparent. Using a slide projector, light was transmitted through the lens in a darkroom, and no muddiness was observed in the lens. As for the optical properties, the refractive index (ne) was 1.704, and the Abbe number (ve) was 30. As for the heat resistance, the Tg point was 94.3° C., which was satisfactory. The impact resistance was "A".

Synthetic Example 2

Into a 2-L flask equipped with a bottom outlet cock, a stirrer, a thermometer, a distillation column, and a capillary for introducing nitrogen was charged 164.2 g (1 mol) of 1,1,3,3-tetramethoxypropane, 488.8 g (4 mol) of acetyl mercaptomethyl mercaptan, and 7.6 g (0.04 mol) of p-toluenesulfonic acid to prepare a mixture. The mixture was heated to 40° C. with stirring at a degree of vacuum of 1 kPa or less. The heating was continued for 18 hours until distillation of methanol came to a halt. After cooling, the vacuum was released, and a condenser was installed to replace the distillation column. To the resulting mixture was added 400 ml of methanol, 400 ml of chloroform, and 200 ml of 36% of hydrochloric acid. The resulting mixture was heated to 60° C. to perform alcoholysis so as to produce a target compound, i.e., 1,1,3,3-tetrakis(mercaptomethylthio)propane (hereinafter, "polythiol compound B").

Adequate amounts of water and chloroform were added to the mixture to perform liquid separation, and the chloroform layer was washed with water several times. Solvent extraction was performed to remove chloroform and low-boiling-point components; subsequently, the mixture was filtered with a 3-μm Teflon filter to obtain 340.0 g of the polythiol compound B. According to the LC analysis of the polythiol compound B, two components other than the polythiol compound B were detected (9.8% and 9.8% based on chromatogram areal ratio). These components were purified by preparative LC and analyzed. They were found to be 4,6-bis(mercaptomethylthio)-1,3-dithiane and 2-(2,2-bis(mercaptomethylthio)ethyl)-1,3-dithietane. The analysis results are shown below.

The SHV of the polythiol compound B (containing the above-described two by-product components) was calculated from the chromatogram area ratio based on LC. The SHV was 10.5 meq/g.

iii) 1,1,3,3-tetrakis(mercaptomethylthio)propane
1H-NMR δ(CDCl3): 2.18 (t, 4H), 2.49 (t, 2H), 3.78-3.90 (m, 8H), 4.64 (t, 2H)
13C-NMR δ(CDCl3): 26.7, 41.3, 48.7
FT-IR: 2538 cm$^{-1}$
MS: m/z=356(M+)

iv) 4,6-bis(mercaptomethylthio)-1,3-dithiane
1H-NMR δ(CDCl3): 2.02 (t, 2H), 2.56 (t, 2H), 3.77-3.91 (m, 4H), 3.97 (s, 2H), 4.66 (t, 2H)
13C-NMR δ(CDCl3): 27.1, 28.8, 38.1, 44.6
FT-IR: 2538 cm$^{-1}$
MS: m/z=276(M+)

vi) 2-(2,2-bis(mercaptomethylthio)ethyl)-1,3-dithietane
1H-NMR δ(CDCl3): 2.03 (t, 2H), 2.13-2.21 (m, 1H), 2.75-2.80 (m, 1H), 3.79-3.84 (m, 1H), 3.90-3.96 (m, 3H), 4.32-4.35 (m, 2H)
13C-NMR δ(CDCl3): 27.2, 32.3, 38.9, 46.2
FT-IR: 2538 cm$^{-1}$
MS: m/z=276(M+)

Example 2

In 45.6 g of xylylene diisocyanate were dissolved 30 mg of dibutyltin dichloride, i.e., the catalyst, 150 mg of Zelec UN (trade name, acidic alkyl phosphoric ester manufactured by Stepan Company), i.e., the internal mold release agent, and 50 mg of Viosorb 583 (trade name, manufactured by Kyodo Chemical Co., Ltd.), i.e., the UV absorber, to prepare a solution. Into the solution was added 54.4 g of the polythiol compound B produced in SYNTHETIC EXAMPLE 2, and the resulting mixture was thoroughly stirred to prepare a monomer mixture. The molar ratio of the mercapto group to the isocyanato group in the monomer mixture was SH/NCO=1.18 at this stage. The monomer mixture was degassed for one hour at 0.6 kPa. A moiety of the mixture was then injected into a lens mold, gradually heated from 40° C. to 130° C., and cured over 20 hours. After cooling, the produced lens was released from the glass mold. The lens was colorless and transparent. Using a slide projector, light was transmitted through the lens in a darkroom, and no muddiness was observed in the lens. As for the optical properties, the refractive index (ne) was 1.693, and the Abbe number (ve) was 30. As for the heat resistance, the Tg point was 99.5° C., which was satisfactory. The impact resistance was "A".

Synthetic Example 3

Into a 2-L flask equipped with a bottom outlet cock, a stirrer, a thermometer, a distillation column, and a capillary for introducing nitrogen was charged 164.2 g (1 mol) of 1,1,3,3-tetramethoxypropane and 488.8 g (4 mol) of acetyl mercaptomethyl mercaptan. The resulting mixture was cooled to 5° C. Into the mixture, 7.6 g (0.04 mol) of p-toluenesulfonic acid was added. The resulting mixture was heated to 50° C. with stirring over four hours while the degree of vacuum was maintained at 2.67 kPa. The heating was continued for about five hours after the temperature was elevated to 50° C. until distillation of methanol came to a halt. After cooling, the vacuum was released, and a condenser was installed to replace the distillation column. Into the resulting mixture was added 176.9 g of methanol, 353.7 g of toluene, and 30.4 g (0.16 mol) of p-toluenesulfonic acid. The resulting mixture was heated to 60° C. to perform alcoholysis so as to form the polythiol compound B.

The toluene layer was washed with an adequate amount of water several times. After performing solvent extraction to remove toluene and low-boiling-point components, the mixture was filtered with 1-μm Teflon filter to obtain 340.0 g of polythiol compound B. As in SYNTHETIC EXAMPLE 2, two components other than the polythiol compound B were detected in the LC analysis. These two components were the same as in SYNTHETIC EXAMPLE 2.

The SHV of the polythiol compound B (containing the above-described two by-product components) was 9.8 meq/g.

Example 3

In 44.3 g of xylylene diisocyanate were dissolved 20 mg of dibutyltin dichloride, i.e., the catalyst, 100 mg of Zelec UN (trade name, acidic alkyl phosphoric ester manufactured by Stepan Company), i.e., the internal mold release agent, and 50 mg of Viosorb 583 (trade name, manufactured by Kyodo Chemical Co., Ltd.), i.e., the UV absorber, to prepare a solution. Into the solution was added 55.7 g of the polythiol compound B produced in SYNTHETIC EXAMPLE 3, and the resulting mixture was thoroughly stirred to prepare a monomer mixture. The molar ratio of the mercapto group to the isocyanato group in the monomer mixture was SH/NCO=1.16 at this stage. The monomer mixture was degassed for one hour at 0.6 kPa and was filtered with 1-μm Teflon filter. A moiety of the mixture was then injected into a lens mold, gradually heated from 40° C. to 130° C., and cured over 20 hours. After cooling, the produced lens was released from the glass mold. The lens was colorless and transparent. Using a slide projector, light was transmitted through the lens in a darkroom, and no muddiness was observed in the lens. As for the optical properties, the refractive index (ne) was 1.695, and the Abbe number (ve) was 30. As for the heat resistance, the Tg point was 100.1° C., which was satisfactory. The impact resistance was "A".

Synthetic Example 4

The same steps were performed as in SYNTHETIC EXAMPLE 3 except that the degree of vacuum was maintained at 4.00 kPa.

The SHV of the polythiol compound B produced was 9.5 meq/g.

Example 4

The same steps were performed as in EXAMPLE 3 except that the polythiol compound B produced in SYNTHETIC EXAMPLE 4 was used. The molar ratio of the mercapto group to the isocyanato group in the monomer mixture was SH/NCO=1.13. The obtained lens was colorless and transparent. Using a slide projector, light was transmitted through the lens in a darkroom, and no muddiness was observed in the lens. As for the optical properties, the refractive index (ne) was 1.696, and the Abbe number (ve) was 30. As for the heat resistance, the Tg point was 100.0° C., which was satisfactory. The impact resistance was "A".

Synthetic Example 5

The same steps were performed as in SYNTHETIC EXAMPLE 3 except that the degree of vacuum was maintained at 5.33 kPa.

The SHV of the polythiol compound B produced was 9.3 meq/g.

Example 5

The same steps were performed as in EXAMPLE 3 except that the polythiol compound B produced in SYNTHETIC EXAMPLE 5 was used. The molar ratio of the mercapto group to the isocyanato group in the monomer mixture was SH/NCO=1.09. The obtained lens was colorless and transparent. Using a slide projector, light was transmitted through the lens in a darkroom, and no muddiness was observed in the lens. As for the optical properties, the refractive index (ne) was 1.696, and the Abbe number (ve) was 30. As for the heat resistance, the Tg point was 103.1° C., which was satisfactory. The impact resistance was "A".

Comparative Example 1

Using 49.8 g of xylylene diisocyanate and 50.2 g of the polythiol compound A, the polymerization was performed as in EXAMPLE 1 to produce a lens. The molar ratio of the mercapto group to the isocyanato group in the monomer mixture was SH/NCO=1.01. As for the optical properties, the refractive index (ne) was 1.700, and the Abbe number (ve) was 30. As for the heat resistance, the Tg point was 96.0° C. The impact resistance was "A".

Comparative Example 2

Using 24.9 g of xylylene diisocyanate and 75.1 g of polythiol compound A, the polymerization was performed as in EXAMPLE 1 . The produced resin was rubbery in room temperature and had poor heat resistance. Moreover, the molar ratio of the mercapto group to isocyanato group in the monomer mixture was SH/NCO=3.004.

Comparative Example 3

Using 50.0 g of xylylene diisocyanate and 50.0 g of the polythiol compound B produced in SYNTHETIC EXAMPLE 2, the polymerization was performed as in EXAMPLE 2 to produce a lens. The molar ratio of the mercapto group to the isocyanato group in the monomer mixture was SH/NCO=0.99. As for the optical properties, the refractive index (ne) was 1.688, and the Abbe number (ve) was 30. As for the heat resistance, the Tg point was 106.0° C. The impact resistance was "A".

Comparative Example 4

Using 24.7 g of xylylene diisocyanate and 75.3 g of the polythiol compound B produced in SYNTHETIC EXAMPLE 2, the polymerization was performed as in EXAMPLE 2. The produced resin was rubbery in room temperature and had poor heat resistance. The molar ratio of the mercapto group to the isocyanato group in the monomer mixture was SH/NCO=3.01.

Comparative Example 5

Using 48.0 g of xylylene diisocyanate and 52.0 g of the polythiol compound B produced in SYNTHETIC EXAMPLE 3, the polymerization was performed as in EXAMPLE 2 to produce a lens. The molar ratio of the mercapto group to the isocyanato group in the monomer mixture was SH/NCO=1.00. As for the optical properties, the refractive index (ne) was 1.690, and the Abbe number (ve) was 30. As for the heat resistance, the Tg point was 106.3° C. The impact resistance was "A".

Comparative Example 6

Using 47.3 g of xylylene diisocyanate and 52.7 g of the polythiol compound B produced in SYNTHETIC EXAMPLE 4, the polymerization was performed as in EXAMPLE 3 to produce a lens. The molar ratio of the mercapto group to the isocyanato group in the monomer mixture was SH/NCO=1.00. As for the optical properties, the refractive index (ne) was 1.690, and the Abbe number (ve) was 30. As for the heat resistance, the Tg point was 106.3° C. The impact resistance was "A".

Comparative Example 7

Using 48.0 g of xylylene diisocyanate and 52.0 g of the polythiol compound B produced in SYNTHETIC EXAMPLE 4, the polymerization was performed as in EXAMPLE 4 to produce a lens. The molar ratio of the mercapto group to the isocyanato group in the monomer mixture was SH/NCO=1.00. As for the optical properties, the refractive index (ne) was 1.690, and the Abbe number (ve) was 30. As for the heat resistance, the Tg point was 109.2° C. The impact resistance was "A".

Comparative Example 8

In 52.0 g of xylylene diisocyanate were dissolved 10 mg of dibutyltin dichloride, i.e., the catalyst, 100 mg of Zelec UN (trade name, acidic alkyl phosphoric ester manufactured by Stepan Company), i.e., the internal mold release agent, and 50 mg of Viosorb 583 (trade name, manufactured by Kyodo Chemical Co., Ltd.), i.e., the UV absorber, to prepare a solution. Into the solution was added 48.0 g of 4-mercaptomethyl-1,8-dimercapto-3,6-dithiaoctane (hereinafter, the "polythiol compound C"), and the resulting mixture was thoroughly mixed to prepare a monomer mixture. The molar ratio of the mercapto group to the isocyanato group in the monomer mixture was SH/NCO=1.00 at this stage. The monomer mixture was degassed for one hour at 0.6 kPa. A moiety of the mixture was then injected into a lens mold, gradually heated from 40° C. to 120° C., and cured over 20 hours. After cooling, the produced lens was released from the glass mold. The lens was colorless and transparent. Using a slide projector, light was transmitted through the lens in a darkroom, and no muddiness was observed in the lens. As for the optical properties, the refractive index (ne) was 1.660, and the Abbe number (ve) was 32. As for the heat resistance, the Tg point was 85.0° C. The impact resistance was "A".

Comparative Example 9

Using 48.5 g of xylylene diisocyanate and 51.5 g of the polythiol compound C, the polymerization was performed as in COMPARATIVE EXAMPLE 5 to produce a lens. The molar ratio of the mercapto group to the isocyanato group in the monomer mixture was SH/NCO=1.15. The lens was colorless and transparent. Using a slide projector, light was transmitted through the lens in a darkroom, and no muddiness was observed in the lens. As for the optical properties, the refractive index (ne) was 1.663, and the Abbe number (ve) was 32. As for the heat resistance, the Tg point was 62.1° C. The impact resistance was "A".

Comparative Example 10

In 50.7 g of xylylene diisocyanate were dissolved 10 mg of dibutyltin dichloride, i.e., the catalyst, 100 mg of Zelec UN (trade name, acidic alkyl phosphoric ester manufactured by Stepan Company), i.e., the internal mold release agent, and 50 mg of Viosorb 583 (trade name, manufactured by Kyodo Chemical Co., Ltd.), i.e., the UV absorber, to prepare a solution. Into the solution was added 49.3 g of 4,8-dimercaptomethyl-1,11-dimercapto-3,6,9-trithiaundecane (hereinafter, the "polythiol compound D"), and the resulting mixture was thoroughly mixed to prepare a monomer mixture. The molar ratio of the mercapto group to the isocyanato group in the monomer mixture was SH/NCO=1.00. The monomer mixture was degassed for one hour at 0.6 kPa. A moiety of the mixture was then injected into a lens mold, gradually heated from 40° C. to 120° C., and cured over 20 hours. After cooling, the produced lens was released from the glass mold. The lens was colorless and transparent. Using a slide projector, light was transmitted through the lens in a darkroom, and no muddiness was observed in the lens. As for the optical properties, the refractive index (ne) was 1.667, and the Abbe number (ve) was 31. As for the heat resistance, the Tg point was 100.2° C. The impact resistance was "A".

Comparative Example 11

Using 46.1 g of xylylene diisocyanate and 53.9 g of the polythiol compound D, the polymerization was performed as in COMPARATIVE EXAMPLE 7 to produce a lens. The molar ratio of the mercapto group to the isocyanato group in the monomer mixture was SH/NCO=1.20. The lens was colorless and transparent. Using a slide projector, light was transmitted through the lens in a darkroom, and no muddiness was observed in the lens. As for the optical properties, the refractive index (ne) was 1.670, and the Abbe number (ve) was 32. As for the heat resistance, the Tg point was 82.1° C. The impact resistance was "A".

The above-described results are summarized in Table 1. In Table 1, Δne and ΔTg denote, respectively, the differences in refractive index (ne) and heat resistance (Tg) between when the molar ratio of the mercapto group to the isocyanato group (SH/NCO) is greater than 1.01 and when the molar ratio of the mercapto group to the isocyanato group (SH/NCO) is not more than 1.0. The larger Δne/ΔTg, the better the heat resistance and the higher the refractive index. The resin made from the polymerizable composition containing the polythiol of the present invention exhibited Δne/ΔTg larger than those of COMPARATIVE EXAMPLES that use conventional polythiols. In other words, the refractive index of the resin improved dramatically. Meanwhile, a decrease in heat resistance was small, and satisfactory impact resistance was maintained. In COMPARATIVE EXAMPLES 5, 6, 7, and 8, the heat resistance drastically degraded as the molar ratio of the mercapto group to the isocyanato group in the polymerizable composition exceeded 1.0.

Regarding the heat resistance of the resin, the heat resistant temperature of the resin of COMPARATIVE EXAMPLE 5, i.e., a typical widespread thiourethane optical resin, was 85.0° C.; accordingly, the resin can be put to practical application if the resin has higher heat resistant temperature than this temperature. Therefore, the resin of each EXAMPLE has sufficient heat resistance. The heat resistance of the resins of COMPARATIVE EXAMPLES 6 and 8 is insufficient. Note that, as shown in COMPARATIVE EXAMPLES 2 and 4, the resin becomes rubbery and exhibits poor heat resistance when the ratio of the mercapto group to the isocyanato group exceeds 3.0. Although the above-described EXAMPLES describe compounds having isocyanato groups, the same results can be obtained by using compounds having isothiocyanato groups.

TABLE 1

| Thiol | | SH/NCO Molar ratio | Refractive index (ne) | Heat resistance °C. | Impact resistance | Δ ne/Tg (×10⁻³) |
|---|---|---|---|---|---|---|
| Polythiol compound A | Ex. 1 | 1.12 | 1.704 | 94.3 | A | 2.11 |
| | C. Ex. 1 | 1.01 | 1.700 | 96.2 | A | |
| Polythiol compound B | Ex. 2 | 1.18 | 1.693 | 99.5 | A | 0.77 |
| | C. Ex. 3 | 0.99 | 1.688 | 106.0 | A | |
| Polythiol compound B | Ex. 3 | 1.16 | 1.695 | 100.1 | A | 0.85 |
| | C. Ex. 5 | 1.00 | 1.690 | 106.0 | A | |
| Polythiol compound B | Ex. 4 | 1.13 | 1.696 | 100.0 | A | 0.95 |
| | C. Ex. 6 | 1.00 | 1.690 | 106.3 | A | |
| Polythiol compound B | Ex. 5 | 1.09 | 1.696 | 103.1 | A | 0.98 |
| | C. Ex. 7 | 1.00 | 1.690 | 109.2 | A | |
| Polythiol compound C | C. Ex. 9 | 1.15 | 1.663 | 62.1 | A | 0.13 |
| | C. Ex. 8 | 1.00 | 1.660 | 85.0 | A | |
| Polythiol compound D | C. Ex. 11 | 1.20 | 1.670 | 82.1 | A | 0.17 |
| | C. Ex. 10 | 1.00 | 1.667 | 100.1 | A | |

*Ex = EXAMPLE,
C. Ex. = COMPARATIVE EXAMPLE

INDUSTRIAL APPLICABILITY

According to the present invention, the refractive index of the resin can be easily increased while maintaining the heat and impact resistance.

The invention claimed is:
1. 4,6-bis(mercaptomethylthio)-1,3-dithiane.
2. 2-(2,2-bis(mercaptomethylthio)ethyl)-1,3-dithietane.

* * * * *